W. J. MARSHALL.
SAW SET.
APPLICATION FILED OCT. 27, 1917. RENEWED FEB. 3, 1919.
1,315,564.
Patented Sept. 9, 1919.
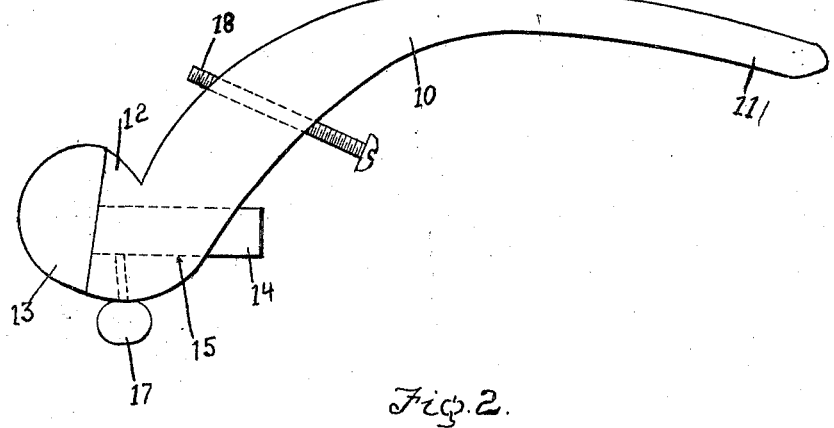
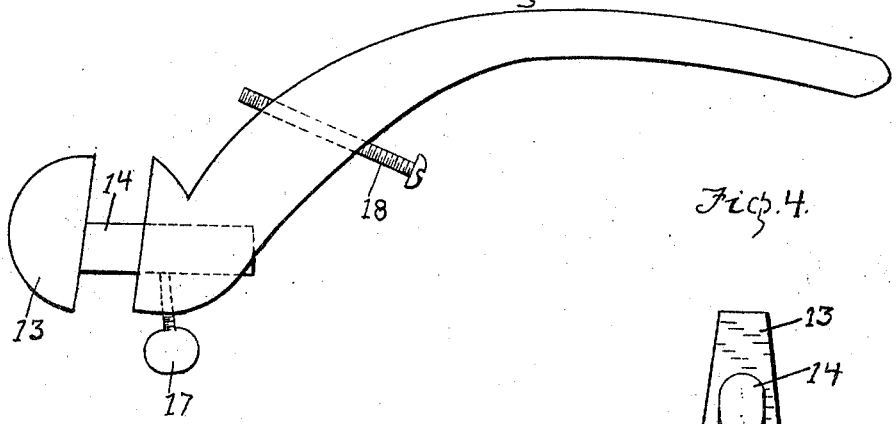
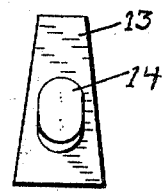
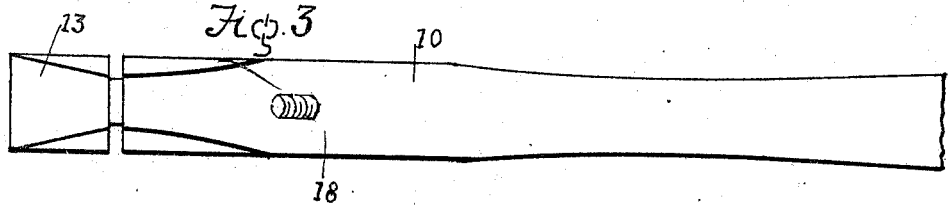
INVENTOR
William J. Marshall.
WITNESSES
Alfred E. Hazel.
Wm Zeaman
Richard Owen.
ATTORTEY

UNITED STATES PATENT OFFICE.

WILLIAM J. MARSHALL, OF CORTEZ, COLORADO.

SAW-SET.

1,315,564.  Specification of Letters Patent.  Patented Sept. 9, 1919.

Application filed October 27, 1917, Serial No. 198,827. Renewed February 3, 1919. Serial No. 274,805.

*To all whom it may concern:*

Be it known that I, WILLIAM J. MARSHALL, a citizen of the United States, residing at Cortez, in the county of Montezuma and State of Colorado, have invented certain new and useful Improvements in Saw-Sets, of which the following is a specification.

This invention has relation to saw setting tools, and has for an object to provide an improved tool for this purpose designed with a view to facilitating saw setting, to permit various adjustments of the tool to the thickness of the saw, and to insure the setting of each tooth at the same angle, means being provided to adjust this device whereby the tool may be set to flex the teeth to any angle desired.

Another object of the invention is to provide a saw setting tool having the above named characteristics which comprises but few parts and those of a simple nature, permitting the construction of the tool and the manufacture thereof in an economical manner.

In addition to the foregoing my invention comprehends improvements in the details of construction and arrangement of the parts to be hereinafter more fully described and particularly set forth in the appended claim.

In the accompanying drawings in which similar and corresponding parts are designated by the same characters of reference throughout the several views in which they appear:

Figure 1, is a view in side elevation of a saw setting tool constructed in accordance with my invention showing the jaws in closed position.

Fig. 2, is a similar view showing the jaws separated,

Fig. 3, is a view of the tool in edge elevation, and

Fig. 4 is a view of the movable jaw.

With reference to the drawings, 10 indicates the handle of the tool which is arcuate throughout its length, tapered at one end as at 11 to provide a comfortable grip, and enlarged at its other end and provided with a jaw face 12. A movable jaw 13 is provided having a shank 14 which extends through an opening 15 in the jaw 12. Attention is called to the fact that the open faces of the jaws 12 and 13 are at an angle to the shank 14 and opening 15 as indicated. A set screw 17 is threadedly engaged in an aperture in the stationary jaw to engage the shank 14 whereby to retain the jaw in any adjusted position.

An adjusting screw 18 is mounted in a threaded opening in the handle of the tool to extend at an angle to the shank 14 and toward the jaw end of the tool as indicated.

In use, the set screw 17 is loosened and the jaw 13 is adjusted toward and away from the stationary jaw to coincide with the thickness of the saw to be set, so as to permit the saw to enter the space between the working faces of the jaws, the set screw being then tightened to retain the jaws in adjusted position. The adjusting screw 18 is then rotated so that when a tooth is engaged between the jaws, and the tool is moved to bend the jaw, the adjusting screw 18 will engage the side of the saw when the tooth has been bent to the angle desired. The adjusting screw 18 thus serves as a stop and insures that each tooth will be bent to the desired angle making the saw uniformly swaged.

Thus it will be seen, that I have provided a tool for saw setting which comprises few parts, suitable for quick assembly, thereby permitting the manufacture of the tool economically. It will also be apparent that the tool is entirely effective for the purpose for which it was designed notwithstanding its simple construction, and is capable of performing the same functions of other tools of a similar character but of a more complicated design. Other advantages will be apparent to those skilled in the art to which this invention appertains.

While I have illustrated and described my invention with some degree of particularity, I realize that in practice various alterations thereto may be made and I therefore desire to reserve the right and privilege of changing the form of the details of construction, or otherwise altering the arrangement of the correlative parts without departing from the spirit of the invention or the scope of the appended claim.

Having thus described my invention what I claim as new and desire to secure by Letters Patent is:—

A swaging tool including an arcuate handle, a semicircular enlargement formed upon one end, having an opening extending therethrough and in the general direction of the handle, the diametrical face of the enlargement forming a jaw face, a movable jaw, a shank on said jaw entering the opening of the enlargement to mount the jaw for reciprocatory movement toward and away from the stationary jaw, a set screw entering the enlargement to engage the shank to variously space the movable jaw from the stationary jaw to receive saws therebetween of variable thickness, and a stop screw extending through the handle to engage the saw to limit movement of the tool.

In testimony whereof I affix my signature in presence of two witnesses.

WILLIAM J. MARSHALL.

Witnesses:
H. M. THOMPSON,
S. G. WALKER.

Copies of this patent may be obtained for five cents each, by addressing the "Commissioner of Patents, Washington, D. C."